J. T. ROBERT.
MEANS FOR TEACHING PARLIAMENTARY LAW.
APPLICATION FILED AUG. 17, 1908.

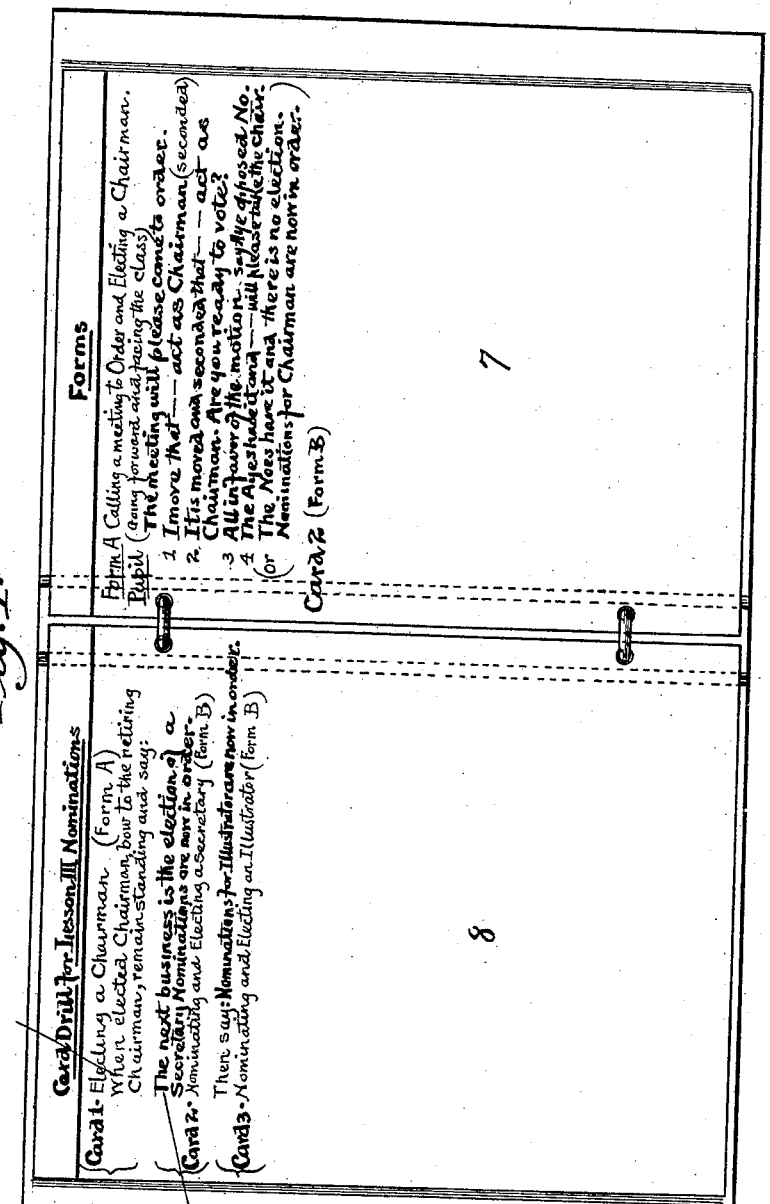

946,868.

Patented Jan. 18, 1910.

2 SHEETS—SHEET 2.

Fig. 3.

I—Obtain the floor.

II—Then say: I nominate —— for Secretary.

Fig. 5.

2nd Chairman

Go forward, bow to the retiring Chairman and say:
1—Nominations for Illustrator are now in order.

Card 3.
2 —— is nominated for Illustrator. Are you ready to vote?
3 All in favor of the nomination say Aye. Those opposed No.
4 The Ayes have it and —— will please act as Illustrator Then say: Will —— (3rd Chairman) please take the chair.
(Wait till the new Chairman comes forward, make him a slight bow and take your seat.)

Fig. 2.

1 I. Go forward, face the Class and say: The Meeting will please come to order.
II. Have a Chairman elected, in this way:
1. I move that —— act as Chairman.
(If not promptly seconded say: Is the motion seconded Chairman. Are you ready to vote?
2 It is moved and seconded that —— act as Chairman. Are you ready to vote?
3 All in favor of the motion say Aye. Those opposed No.
4 The Ayes have it and —— will please take the chair.

(When the Chairman comes forward make him a slight bow and take your seat in the Class)

Fig. 4.

1st Chairman

Go forward, bow to the retiring Chairman, and say:
1—The next business is the election of a Secretary. Nominations are now in order.

Card 2.
2 —— is nominated for Secretary. Are you ready to vote?
3 All in favor of the nomination say Aye. Those opposed No
4 The Ayes have it and —— will please act as Secretary.

Then say: Will —— (2nd Chairman) please take the chair
(Wait till the new Chairman comes forward, make him a slight bow and take your seat.)

Witnesses,
F. S. Mann
Arthur L. Bryant

Inventor,
Joseph T. Robert.
By Offield, Towle & Linthicum.
Attys.

UNITED STATES PATENT OFFICE.

JOSEPH T. ROBERT, OF CHICAGO, ILLINOIS.

MEANS FOR TEACHING PARLIAMENTARY LAW.

946,868.
Specification of Letters Patent.
Patented Jan. 18, 1910.

Application filed August 17, 1908. Serial No. 448,941.

*To all whom it may concern:*

Be it known that I, JOSEPH T. ROBERT, a citizen of the United States, residing in Chicago, county of Cook, and State of Illinois, have invented certain new and useful Improvements in Means for Teaching Parliamentary Law, of which the following is a specification.

The invention relates in general to means for teaching parliamentary law, but pertains more in particular to a card system for teaching parliamentary law to a class.

The invention is not limited to any particular class of people, as the card system is adapted for all classes, both young and old, the principal object being to teach any given body of people the fundamental and intricate principles of parliamentary law, by making the individual members of the body think for themselves; know just exactly what any individual is to do; to recognize and courteously yield to the rights of other individuals in the body; know just what authority belong to the chairman of the meeting; know not only their own rights as members of an assembly or meeting and how to protect them, but to further instruct individuals to be able to preside acceptably at public meetings, having their minds trained to correct habits of thought, speech and action, so they will instinctively say and do the right thing at the proper time, the broad general object being to qualify all individuals to take an active and intelligent part in the meeting of any assembly conducted under the well-known rules of parliamentary practice.

In its general form, the invention consists in the distribution of cards to the individual members of a class or assembly or any collective body; said cards being numbered consecutively, and each card having thereon different instructions as to how the party holding the card shall act, and what he shall say; there being designating marks upon each card denoting action and designating marks denoting speech, so that instantly upon examining the card the individual can see what is to be done and what is to be said.

A separate set of cards is provided for the chairman of the meeting, having thereon instructions for the chairman as to what is to be done and said, with designating marks distinguishing the physical action and speech, and a further set of cards is provided for the illustrator, who is instructed to write upon the blackboard resolutions, motions, etc., which may arise during the course of the meeting; the object in placing such resolutions upon the blackboard is that the class or assembled body may have an opportunity to view the exact question before the assembly, before passing upon the same. It is extremely difficult for an untrained body in parliamentary law, to carry in mind any resolutions made and especially so in regard to amendments, where there are numerous amendments to amendments or certain portions of the motions or amendments are stricken out and other portions added. Therefore, it is best to have the various motions, etc. written upon the board at the start, so that the class may be able to see in writing the logical course of the meeting, and to see what action has been taken and the question pending before the assembly in its present form, and all actions thereon.

It is sometimes necessary that a key to the entire situation be provided, ordinarily held by the teacher or the one acting as instructor, which key is in the nature of a book, having upon the left hand side or page thereof, the course of procedure for the chairman and the number of the cards held by the individual members, arranged in chronological order. On the opposite or the right hand side of the book is set forth the written matter appearing upon the individual cards, so that the teacher may be able to view exactly what each individual member is to say or do when the number of the individual card is called.

The invention will be more fully explained, and an illustration of the same is shown in the accompanying drawings, in which—

Figure 1 is a plan view of two of the pages of the key or book; Figs. 2 and 3 plan views of two of the members' cards; Figs. 4 and 5, plan views of chairman's cards.

Referring now more particularly to the invention and to the course of procedure in utilizing the same, the various cards are distributed throughout the members of the class, and certain sets of cards are given by the instructor to the individuals who are to act as chairmen. After all the cards have been distributed, the instructor calls for card 1.

Referring now to Fig. 1, 6 represents as a whole a book, having right and left hand pages, 7 and 8, respectively. As herein shown, the pages opened in the book refer to card drill for lesson 3. On page 8 are set forth various cards arranged in numerical order, and opposite each card number is printed matter setting forth the course of procedure of the meeting, both as to what is to be done, and what is to be said. On the right hand side of the book, page 7, are set forth the forms which refer to the cards set forth on page 8. For instance: the printed matter appearing on the right hand page 7, is substantially identical with the printed matter upon card 1, herein designated as 9. It is to be noted that the successive steps of the meeting are herein shown in light lines designated as 10, while what is to be said by the parties holding the cards is designated in heavy lines or type, 11.

Throughout the entire system, the successive steps of the meeting as to what is to be done, will be shown in light lines or type, both upon the pages of the book and upon the individual cards, and what is to be said by either the chairman, instructor or members of the class, will be shown in heavy dark lines. It is not, however, essential that the manner of distinguishing the two be confined to heavy and light lines, but it is to be understood that any distinguishing mark or color might be used for the same.

The instructor having now distributed the cards throughout the members of the class, card 1 herein designated as 9, is called, and the member of the class holding card 1 finds the first instruction: "Go forward, face the class and say"; having done as instructed, the member says, as shown in the heavy dark lines, 11, "The meeting will please come to order". And then follows in successive steps upon card 1 the various things that are to be done and said by the party holding the same.

At the bottom of card 1 are found instructions as to what the party holding the same is to do after the chairman has been elected, and the chairman having come forward, having been instructed to do so by the member holding card 1, the chairman obtains his instructions from the first chairman's card, 12, his instructions being, "Go forward, bow to the retiring chairman and say", the chairman speaking as follows, according to the instructions upon his card, "The next business is the election of a secretary; nominations are now in order", whereupon the instructions upon the first chairman's card is "Card 2", whereupon card 2, herein designated as 13, is called, and the member of the class holding same, finds the following instructions: "Obtain the floor, then say, I nominate ———— ———— for secretary".

The member holding card 2 having nominated a member of the class for secretary, the further steps are set forth by instructions 2, 3 and 4, herein designated as 14, found upon card 12, and after said secretary has been duly nominated the member holding card 12 and acting as first chairman then says: "Will ———— ———— (second chairman) please take the chair", and after the new chairman has come forward according to instructions upon the second chairman's card 15, the second chairman then proceeds to follow out the instructions disclosed in the four successive steps, herein designated as 16, appearing upon the second chairman's card, including the nominating and electing of the illustrator, it being the duty of the second chairman to call card 3, the member holding said card proceeding to nominate the illustrator.

It is not thought necessary to go further into the detail of the operation of the system, nor to show any further cards with the printed matter thereon, it being only sufficient to state that each and every step in its logical order of the meeting is set forth upon the various cards distributed throughout the members of the class, as well as upon the cards held by the chairman of the meeting, and that each card is so numbered and has such designating marks thereon, and are so related to each other that the logical course of the meeting will necessarily follow, if the instructions upon each card are properly read and followed by the member of the class holding the same. If by any chance, the steps of the meeting are not carried out in accordance with the instructions found upon the various cards, the instructor or teacher holding the book 6 is provided with a key or book, which not only sets forth what the individual members are to do and say, but also what is to be done and said by the chairman of the meeting, and therefore any mistake on the part of the members of the assembly can be instantly corrected by the teacher or instructor holding the book 6.

It is to be further understood that as many cards can be used as are desired, according to the character of the meeting to be held. It is sometimes advantageous and I preferably employ a set of cards adapted to be held by an illustrator of the meeting; the duty of the illustrator being to place in writing upon a blackboard or upon other suitable means, the names of all parties nominated; all motions and amendments, or any matter which would otherwise have to be carried in the mind of the individual members composing the assembly, before finally passing upon any nomination or any question whatsoever, and the illustrator's cards would be so related with the cards held by the chairman or individual members of the class, and would have such instructions thereon that the illustrator would be informed as to the exact point of time at which certain matter was to be written down, and manner of doing so to indicate the action taken.

It is obvious that there might be various changes in the subject matter contained on the cards, or that the book held by the teacher might be omitted from the system and only the chairman's and pupils' cards used, and it is also obvious that the cards need not necessarily be distributed among all the individuals composing the class, but that only certain individuals might hold the same.

In the preferred form of the invention, the cards are arranged in a progressive system, that is, for the unskilled and younger body of individuals, a short system of cards with subject matter thereon adapted for the untrained and young mind, while as the intelligence or mental capacities of the body increased, the subject matter upon the cards would thereby increase until there was provided as many different sets of cards as are adapted for the different mental capacity or grades of classes. And therefore without limiting myself to the particular cards herein shown, or without limiting myself to any particular material upon the cards themselves,—

I claim:

1. The herein described cards for teaching parliamentary law, comprising a series of cards having designating marks thereon denoting action, and marks differing from the action marks, denoting speech, certain of said series of cards adapted to be distributed among individual members of a body, each card being numbered, said numbers varying, and a certain portion of said cards adapted to be held by a chairman or the like, substantially as described.

2. The herein described cards for teaching parliamentary law, comprising a plurality of cards, having designating marks thereon denoting action, marks differing from the action marks denoting speech, said cards adapted to be distributed among the individual members of an assembly and among the chairmen therefor, each card having a number thereon corresponding to a like number upon one of the other cards, whereby a member of the assembly holding a card may be informed as to the exact point of time at which he is to take part in the meeting, substantially as described.

3. The herein described cards for teaching parliamentary law, comprising the combination of a series of cards having designating numbers thereon arranged in numerical order, each card having a number referring to the number of some other card, and designating marks upon each card for denoting action and speech, substantially as described.

4. The herein described cards for teaching parliamentary law, comprising the combination of a series of cards having numbers thereon arranged in numerical order, each card having a number thereon referring to the number of some other card and designating marks for distinguishing what is to be done and said by the party holding said card, and a key adapted to be held by an instructor or the like, having the number of the cards arranged in chronological order, and the exact matter upon each card arranged opposite to the card number appearing in said key, substantially as described.

JOSEPH T. ROBERT.

Witnesses:
JAMES R. OFFIELD,
HENRY H. GRAHAM.